(12) United States Patent
Liu et al.

(10) Patent No.: US 10,536,065 B2
(45) Date of Patent: Jan. 14, 2020

(54) LINEAR VIBRATION MOTOR

(71) Applicant: GOERTEK INC., WeiFang, Shandong (CN)

(72) Inventors: Chunfa Liu, WeiFang (CN); Fenglei Zu, WeiFang (CN)

(73) Assignee: GOERTEK INC., Weifang, Shandong (CN)

( * ) Notice: Subject to any disclaimer, the term of this patent is extended or adjusted under 35 U.S.C. 154(b) by 68 days.

(21) Appl. No.: 15/776,009

(22) PCT Filed: May 31, 2016

(86) PCT No.: PCT/CN2016/084037
§ 371 (c)(1),
(2) Date: May 14, 2018

(87) PCT Pub. No.: WO2017/088421
PCT Pub. Date: Jun. 1, 2017

(65) Prior Publication Data
US 2018/0331608 A1    Nov. 15, 2018

(30) Foreign Application Priority Data

Nov. 25, 2015 (CN) .......................... 2015 1 0835549

(51) Int. Cl.
*H02K 33/00* (2006.01)
*H02K 33/18* (2006.01)
(52) U.S. Cl.
CPC .................................... *H02K 33/18* (2013.01)
(58) Field of Classification Search
CPC .......... H02K 33/00; H02K 1/34; H02K 33/06; H02K 33/18
(Continued)

(56) References Cited

U.S. PATENT DOCUMENTS

2012/0104875 A1   5/2012  Park
2016/0226365 A1*  8/2016  Wang ..................... H02K 33/16
(Continued)

FOREIGN PATENT DOCUMENTS

CN      201577016 U    9/2010
CN      201789399 U    4/2011
(Continued)

OTHER PUBLICATIONS

International Search Report and Written Opinion, State Intellectual Property Office, P.R. of China, dated Sep. 2, 2016.
(Continued)

*Primary Examiner* — Thanh Lam
(74) *Attorney, Agent, or Firm* — Holzer Patel Drennan

(57) ABSTRACT

A linear vibration motor comprises a vibrator and a stator disposed parallel to the vibrator, the vibrator comprising a weight block and a vibration block embedded in the weight block, and the stator comprises stator coils and a magnetic conductive cores disposed in the stator coil, wherein the vibration block comprises at least two magnetic members arranged in a row and magnetic reinforcement members disposed between adjacent magnetic members, and the magnetic members and the magnetic reinforcement members are permanent magnets; adjacent ends of each two adjacent magnetic members have the same polarity; and the magnetization direction of the magnetic reinforcement member is perpendicular to that of the magnetic member. The linear vibration motor can increase the magnetic lines of force passing through the stator coil, thereby intensifying the vibration effect of the product.

11 Claims, 4 Drawing Sheets

(58) Field of Classification Search
USPC .................................................. 310/17, 25
See application file for complete search history.

(56) References Cited

U.S. PATENT DOCUMENTS

2016/0254736 A1* 9/2016 Jin .................... H02K 33/16
                                                              310/25
2018/0111163 A1* 4/2018 Xu .................... B06B 1/045

FOREIGN PATENT DOCUMENTS

| CN | 202068311 U | 12/2011 |
|---|---|---|
| CN | 203416119 U | 1/2014 |
| CN | 103855856 A | 6/2014 |
| CN | 104660106 A | 5/2015 |
| CN | 104682656 A | 6/2015 |
| CN | 105281527 A | 1/2016 |
| CN | 205178827 U | 4/2016 |
| EP | 2608373 A1 | 6/2013 |
| JP | H08116658 A | 5/1996 |
| JP | 2008306836 A | 12/2008 |

OTHER PUBLICATIONS

Office Action (1), 201510835549.7, State Intellectual Property Office, P.R. of China, dated Apr. 27, 2016.
Office Action (2), 201510835549.7, State Intellectual Property Office, P.R. of China, dated Sep. 20, 2017.

* cited by examiner

LINEAR VIBRATION MOTOR

TECHNICAL FIELD

The present invention relates to technical field of consumer electronic products, and more particularly relates to a linear vibration motor for portable consumer electronic products.

BACKGROUND

With the development of communication technology, portable electronic products such as mobile phones, handheld game player or handheld multimedia entertainment apparatus have come up to people's lives. In these portable electronic products, micro vibration motors are generally used for providing system feedback, such as mobile phones notification on an incoming call, game player's vibration feedback and the like. However, with the development tendency for electronic products to be lightening and thinning, a variety of internal components thereof also need to suitable for this tendency, and micro vibration motor is no exception.

The existing micro vibration motor generally comprises an upper cover, a lower cover which forms a vibration space with the upper cover, a vibrator (including a weight block and a magnetic member, and the magnetic member is made of permanent magnet) performing a linear reciprocate vibration in the vibration space, an elastic support member connecting to the upper cover and driving the vibrator to perform a reciprocate vibration, and a stator coil located under the vibrator by a certain distance.

In the micro vibration motor of the above described structure, the magnetic members in the vibrator are disposed side by side and have the same magnetization direction, i.e., the N pole and the S pole of the adjacent magnetic members are adjacent; the magnetic member and the stator coil are disposed perpendicular to each other, i.e., the direction where the N-S poles of the magnetic member are located is perpendicular to the winding direction of the stator coil, so that the magnetic lines of force of the magnetic member can vertically pass through the stator coil, thereby utilizing the magnetic field of the magnetic member as much as possible.

However, in the micro vibration motor of the above-described structure, the magnetic lines of force generated by the magnetic member in the vibrator are relatively dispersed, and the magnetic flux passing through the stator coil is also relatively small, thus the force generated thereby is relatively small, which affects the vibration effect and the user experience.

SUMMARY

In view of the above problems, an object of the present invention is to provide a linear vibration motor so as to solve the problem exist in the current motor that the weak vibration effect of the motor caused by the relatively dispersed magnetic lines of force passing through the stator coil.

The present invention provides a linear vibration motor comprising a vibrator and a stator disposed parallel to the vibrator, wherein the vibrator comprises a weight block and a vibration block embedded in the weight block, and the stator comprises a stator coil and a magnetic conductive core disposed inside the stator coil, wherein the vibration block comprises at least two magnetic members arranged in a row and a magnetic reinforcement member disposed between adjacent magnetic members, and the magnetic members and the magnetic reinforcement member are permanent magnets; and adjacent ends of each two adjacent magnetic members have the same polarity; and a magnetization direction of the magnetic reinforcement member is perpendicular to that of the magnetic members.

Preferably, a magnetic pole direction of the magnetic reinforcement member is matched with a magnetization direction of the magnetic member at two sides of the magnetic reinforcement member, such that the magnetic fields in the stator coil generated by the magnetic reinforcement member and the magnetic member are superposed.

More preferably, the vibration block comprises three magnetic members arranged in a row and two magnetic reinforcement members disposed between adjacent magnetic members, wherein the magnetic reinforcement members includes a first magnetic reinforcement member and a second magnetic reinforcement member from left to right respectively; the stator comprises a first stator positioned at an upper side of the vibration block and a second stator positioned at a lower side of the vibration block; and one end of the first magnetic reinforcement member close to the first stator has the same magnetic polarity as adjacent ends of the magnetic members at two sides of the first magnetic reinforcement member, and one end of the second magnetic reinforcement member close to the second stator has the same magnetic polarity as adjacent ends of the magnetic members at two sides of the second magnetic reinforcement member.

In addition, preferably, the vibration block comprises three magnetic members arranged in a row and two magnetic reinforcement members disposed between adjacent magnetic members, wherein the magnetic reinforcement members include a first magnetic reinforcement member and a second magnetic reinforcement member from left to right respectively; the stator is disposed at one side of the vibration block; one end of the first magnetic reinforcement member close to the stator has the same magnetic polarity as adjacent ends of the magnetic members at two sides of the first magnetic reinforcement member; and one end of the second magnetic reinforcement member close to the stator has the same magnetic polarity as adjacent ends of the magnetic members at two sides of the second magnetic reinforcement member.

In addition, preferably, the vibration block comprises two magnetic members arranged in a row and a magnetic reinforcement member disposed between the two magnetic members; the stator is disposed at one side of the vibration block; and one end of the magnetic reinforcement member close to the stator has the same magnetic polarity as the ends of the two magnetic members.

In addition, preferably, the vibration block comprises three magnetic members arranged in a row and two magnetic reinforcement members disposed between adjacent magnetic members, wherein the magnetic reinforcement members include a first magnetic reinforcement member and a second magnetic reinforcement member from left to right respectively; the stator comprises a first stator and a second stator disposed on a same side of the vibrator; and one end of the first magnetic reinforcement member close to the first stator has the same magnetic polarity as adjacent ends of the magnetic members at two sides of the first magnetic reinforcement member; one end of the second magnetic reinforcement member close to the second stator has the same magnetic polarity as adjacent ends of the magnetic members at two sides of the second magnetic reinforcement member.

In addition, preferably, an axis direction of the stator coil is perpendicular to a magnetization direction of the magnetic members of the vibration block, and the magnetic reinforcement member and the magnetic conductive core are arranged in a misaligned manner.

In addition, preferably, a misaligned distance between the magnetic reinforcement member and the magnetic conductive core in a horizontal direction is in the range of 0.1 mm to 0.3 mm.

In addition, preferably, the first stator comprises a first stator coil and a first magnetic conductive core disposed in the first stator coil, and the second stator comprises a second stator coil and a second magnetic conductive core disposed in the second stator coil; and the axes of the first stator coil and the second stator coil are disposed parallel to each other, and the current directions in the first stator coil and the second stator coil are opposite.

In addition, preferably, the linear vibration motor further comprises: a housing; push-pull magnets symmetrically provided at two ends of the vibrator; and push-pull coils surrounding the push-pull magnets and fixedly arranged on the housing at a positions corresponding to the push-pull magnets, wherein the push-pull magnets are received in receiving grooves provided in the weight block.

In addition, preferably, the linear vibration motor further comprises push-pull coil bobbins, and the push-pull coils are wound on the push-pull coil bobbins.

In the linear vibration motor of the above present invention, a magnetic reinforcement member is disposed between adjacent magnetic members of the vibrator, and the magnetic lines of force generated by the vibrator in the stator are reinforced by the magnetic reinforcement member, so as to increase the acting force applied to the vibrator and improve the vibration effect and the user experience of the linear vibration motor.

In order to achieve the above and related purposes, one or more aspects of the present invention comprise the features that will be described below in detail and particularly set forth in claims. The following description and the drawings explain certain illustrative aspects of the present invention in detail. However, these aspects are merely some of the various embodiments which can utilize the principles of the present invention. In addition, the present invention is intended to comprise all these aspects and their equivalents.

BRIEF DESCRIPTION OF DRAWINGS

The other purposes and results of the present invention will become more clear and easy to understand through the following descriptions in combination with the accompanying drawings and contents of claims, along with better understanding of the present invention. In the drawings:

FIG. 3-1 is schematic drawing of an assembled structure of a vibration block and a stator according to an embodiment of the present invention;

FIG. 3-2 is a schematic drawing of the force applied to the vibrator in the state that the stator coil in FIG. 3-1 is energized;

FIG. 5-1 is a schematic drawing of an assembled structure of a vibration block and a stator according to still another embodiment of the present invention;

FIG. 5-2 is a schematic diagram of the force applied to the vibrator in the state that the stator coil in FIG. 5-1 is energized;

FIG. 6-1 is a schematic diagram of an assembled structure of a vibration block and a stator according to still another embodiment of the present invention; and FIG. 6-2 is a schematic diagram of the force applied to the vibrator in the state that the stator coil in FIG. 6-1 is energized.

Figure 1:
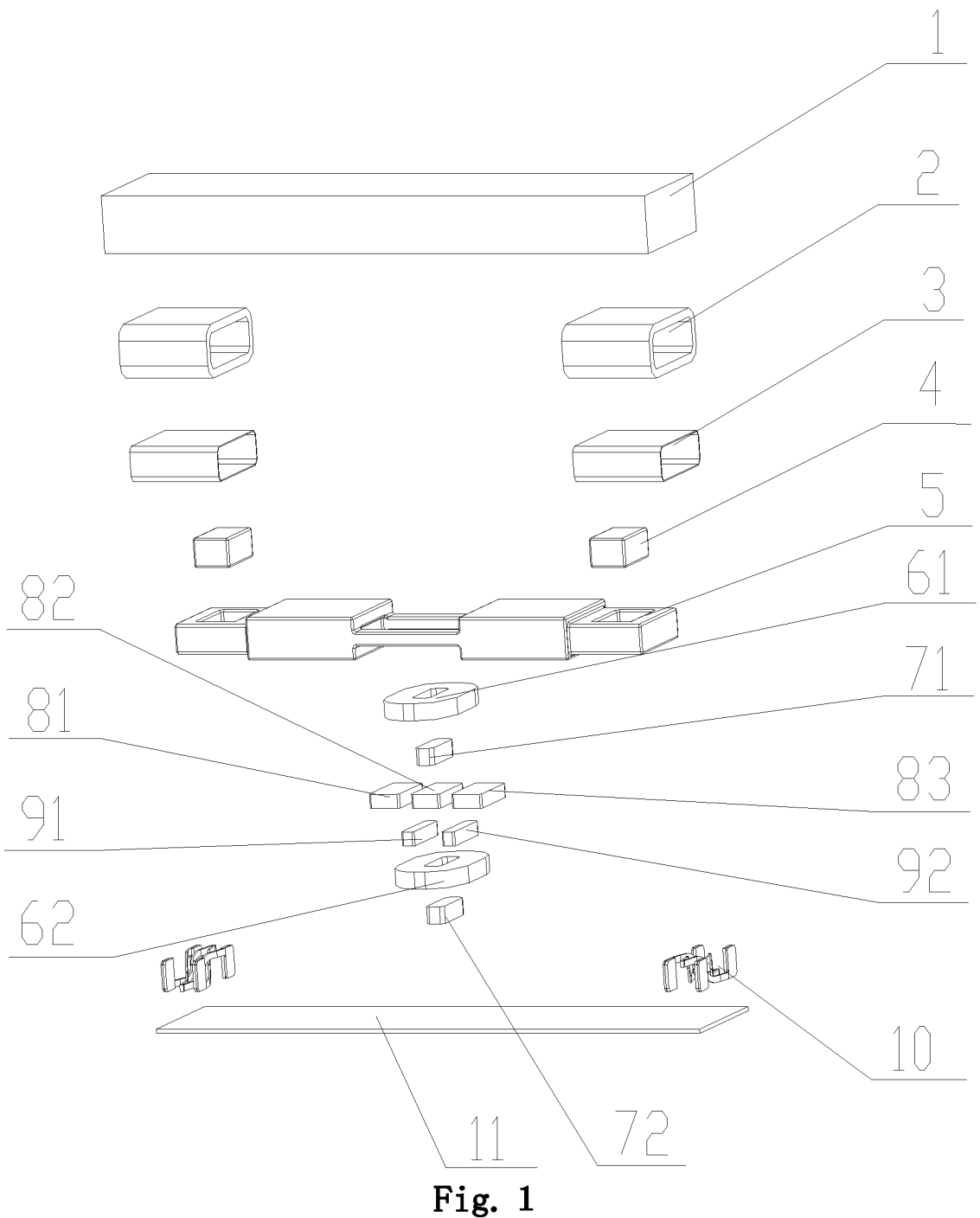
FIG. 1 is a schematic drawing of an exploded structure of a linear vibration motor according to an embodiment of the present invention.

The reference numerals include: an upper cover 1, a push-pull coil 2, a push-pull coil bobbin 3, a push-pull magnet 4, a weight block 5, a first stator coil 61, a second stator coil 62, a first magnetic conductive core 71, a second magnetic conductive core 72, a first magnetic member 81, a second magnetic member 82, a third magnetic member 83, a first magnetic reinforcement member 91, a second magnetic reinforcement member 92, an elastic support member 10, and a lower cover 11.

The same reference numbers indicate similar or corresponding features or functions throughout drawings.

DETAILED DESCRIPTION

In the following description, for the purposes of illustration, numerous specific details are explained in order to provide a thorough understand on one or more embodiments. However, it is apparent that these embodiments can be implemented without these specific details. In other examples, well-known structures and apparatus are illustrated in the form of block diagram in order to facilitate describing one or more embodiments.

In order to solve the problems of weak vibration effect and poor user experience in the existing motor, a magnetic reinforcement member is disposed between the magnetic members of the vibrator in the present invention, and the magnetic lines of force passing through the stator are increased by the magnetic reinforcement members, thereby the vibration effect of the product is intensified.

In the following, the particular embodiments of the linear vibration motor according to the present invention will be described in detail by referring to the accompanying drawings.

Figure 2:
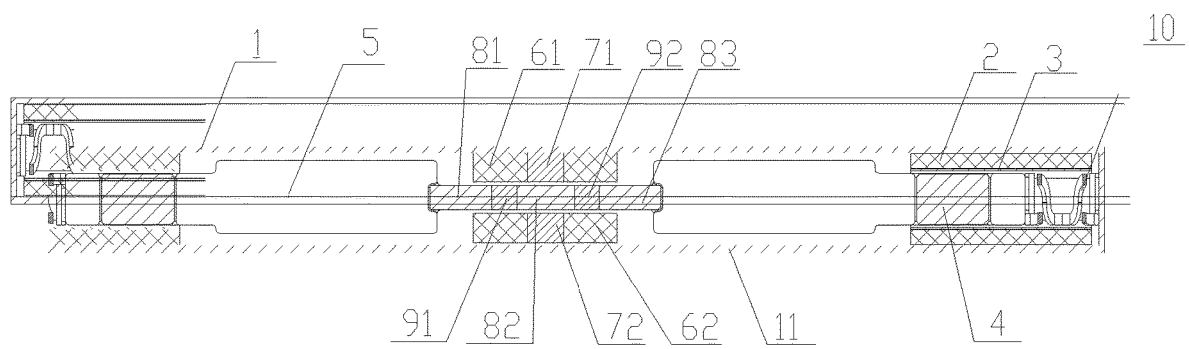
FIG. 2 is a schematic drawing of a sectional structure of a linear vibration motor according to an embodiment of the present invention.

FIG. 1 shows an exploded structure of a linear vibration motor according to an embodiment of the present invention, and FIG. 2 shows a sectional structure of the linear vibration motor.

As shown in FIG. 1 and FIG. 2, the linear vibration motor according to an embodiment of the present invention comprises an upper cover 1, a lower cover 11 that forms a vibration space with the upper cover 1, a vibrator performing linear reciprocate vibration in the vibration space, elastic support members 10 located at both ends of the vibrator and support the reciprocate vibration of the vibrator, and stators positioned above and/or under the vibrator by a certain distance and disposed parallel to the vibrator.

The vibrator comprises a weight block 5 and a vibration block embedded in the weight block, and the stator comprises a stator coil and a magnetic conductive core disposed inside the stator coil, wherein the vibration block comprises at least two magnetic members arranged in a row and a magnetic reinforcement member disposed between the adjacent magnetic members, and all of the magnetic members and the magnetic reinforcement member are permanent magnets, adjacent ends of each two adjacent magnetic members have the same polarity; and a magnetization direction of the magnetic reinforcement member is perpendicular to that of the magnetic members. The magnetic pole direction of the magnetic reinforcement member is matched with the magnetization direction of the magnetic members on two sides of the magnetic reinforcement member, such that the magnetic fields in the stator coil generated by the magnetic reinforcement member and the magnetic members are superposed, thereby the magnetic lines of force passing through the stator coil is increased by the magnetic reinforcement. The stator comprises stator coils disposed on one side or both upper and lower sides of the vibrator, and magnetic conductive cores disposed inside the stator coils, and the axis direction of the stator coils are perpendicular to the magnetization direction of the magnetic members in the vibration block; in the case where the stator comprises the stator coils disposed on both upper and lower sides of the vibration block and the magnetic conductive cores disposed inside the stator coils, the stator coils disposed on the upper and lower sides of the vibration block are parallel to each other and have opposite current directions.

In the specific embodiments shown in FIGS. 1 and 2, the vibration block is composed of three magnetic members arranged in a row and magnetic reinforcement members respectively disposed between adjacent magnetic members, i.e., the vibration block comprises a first magnetic member 81, a second magnetic member 82, a third magnetic member 83, a first magnetic reinforcement member 91 disposed between the first magnetic member 81 and the second magnetic member 82, and a second magnetic reinforcement member 92 disposed between the second magnetic member 82 and the third magnetic member 83.

The stator comprises a first stator positioned at the upper side of the vibrator and a second stator positioned at the lower side of the vibrator. The first stator comprises a first stator coil 61 and a first magnetic conductive core 71 disposed inside the first stator coil 61. The second stator comprises a second stator coil 62 and a second magnetic conductive core 72 disposed inside the second stator coil 62. The first stator coil 61 and the second stator coil 62 are disposed parallel to each other and the axial directions thereof are located on the same line, and the current directions of the first stator coil 61 and the second stator coil 62 are opposite.

Preferably, in the case that three magnetic members arranged in a row, each magnetic member and its adjacent magnetic member have the same polarity at adjacent end, i.e., arranged in the order of S-N, N-S, and S-N, or N-S, S-N, and N-S, and the magnetization direction of the magnetic member is perpendicular to the axis direction of the stator coil of the stator, and the magnetic reinforcement members are disposed between the adjacent magnetic members. At this time, one end of the first magnetic reinforcement member 91 close to the first stator has the same magnetic polarity as adjacent ends of the magnetic member positioned at two sides of the first magnetic reinforcement member 91, i.e., having the same magnetic polarity as adjacent ends of the first magnetic member 81 and the second magnetic member 82, and it is showed as the N pole in the drawings. Similarly, one end of the second magnetic reinforcement member 92 close to the second stator has the same magnetic polarity as adjacent ends of the magnetic member positioned at two sides of the second magnetic reinforcement member 92, i.e., having the same magnetic polarity as adjacent ends of the second magnetic member 82 and the third magnetic member 83, and it is showed as the S pole in the drawings. Herein, the axis direction of the stator coil is the direction of the center axis of the stator coils and the magnetic conductive cores. In this specific embodiment, the magnetization direction of the magnetic member is the horizontal direction, and the axis direction of the stator coil is the vertical direction. With the above configuration, the magnetic fields in the stator coil generated by the magnetic member and the magnetic reinforcement member are superposed. Hence, the magnetic flux passing through the stator coil may be maximized.

Preferably, the magnetic reinforcement members and the magnetic conductive cores are arranged in a misaligned manner. As shown in FIG. 2, the distance that the magnetic reinforcement member and the magnetic conductive core are misaligned in the horizontal direction is in the range of 0.1 mm to 0.3 mm, i.e., the horizontal distance between the center line of each magnetic reinforcement member and the center line of the magnetic conductive core of the nearest stator is 0.1 mm to 0.3 mm. As shown in FIG. 2, the horizontal distance between the first magnetic conductive core 71 and the first magnetic reinforcement member 91, and the horizontal distance between the first magnetic conductive core 71 and the second magnetic reinforcement member 92 are equal to the horizontal distance between the second magnetic conductive core 72 and the first magnetic reinforcement member 91, and the horizontal distance between the second magnetic conductive core 72 and the second magnetic reinforcement member 92, and these horizontal distances are in the range of 0.1 mm to 0.3 mm.

In addition, a receiving structure (not shown) for receiving the stator is provided on the weight 5 at a position corresponding to the stator, and a groove (not shown) for receiving the vibration block is provided on the weight 5 at a middle position. The length of the second magnetic member 82 in the horizontal direction can be greater than the length of other adjacent magnetic members. The weight block 5 can be made of a high-density metal material such as tungsten steel or nickel steel or nickel-tungsten alloy, so that the vibration effect of the electronic product will be intensified.

The following will respectively describe embodiments that two or three magnetic members are provided in the vibrator, the stator coils in the stator are arranged on one side or two sides of the vibrator, and one or two stator coils provided.

Figures 1, 3:
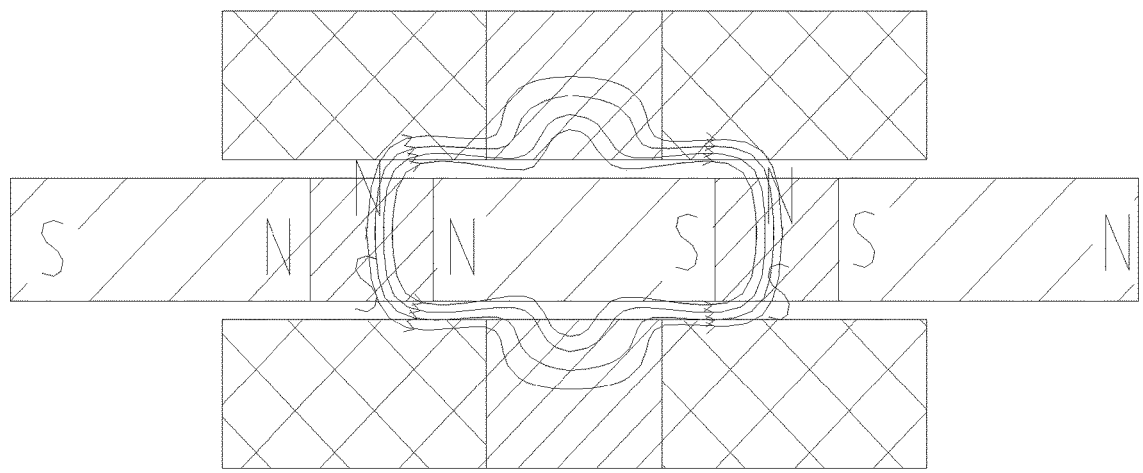
Figures 2, 3:
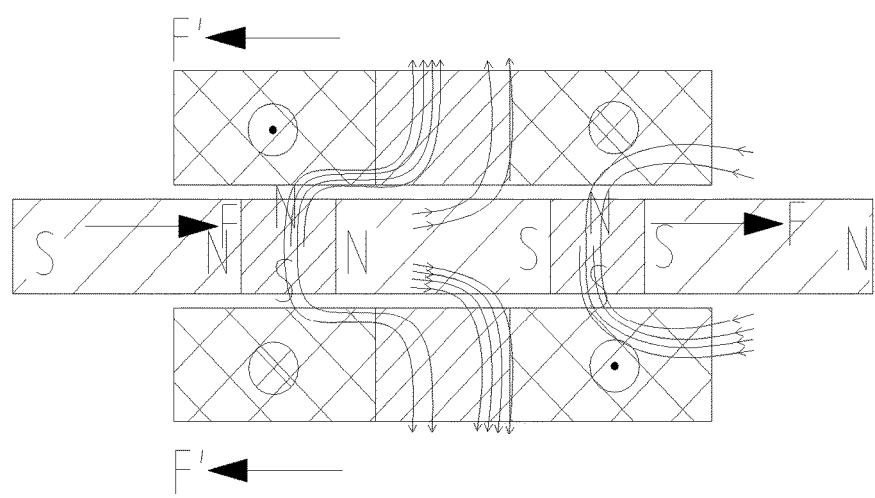

FIG. 3-1 shows an assembled structure of a vibration block and a stator according to an embodiment of the present invention; FIG. 3-2 shows the circumstance when the vibrator is subjected to a force in the state that the stator coil shown in FIG. 3-1 is energized.

In this specific embodiment, the vibration block comprises three magnetic members arranged in a row (there are a first magnetic member, a second magnetic member, and a third magnetic member in left-to-right order) and magnetic reinforcement members arranged between adjacent magnetic members, wherein a first magnetic reinforcement member is arranged between the first magnetic member and the second magnetic member, and a second magnetic reinforcement member is arranged between the second magnetic member and the third magnetic member. The stator comprises a first stator positioned at the upper side of the vibrator and a second stator positioned at the lower side of the vibrator. The first stator comprises a first stator coil and a first magnetic conductive core arranged in the first stator coil, and the second stator comprises a second stator coil and a second magnetic conductive core arranged in the second stator coil. The first stator coil and the second stator coil are arranged parallel to each other, and the current directions of the first stator coil and the second stator coil are opposite.

Preferably, the magnetization direction of the first magnetic reinforcement member (the upper end thereof is the N pole and the lower end thereof is the S pole) is the same as the magnetization direction of the second magnetic reinforcement member, and the magnetization directions of the first magnetic reinforcement member and the second magnetic reinforcement member are perpendicular to the magnetization direction of the magnetic members. When the first stator coil and the second stator coil are respectively supplied with a current as shown in the drawing (the current direction indicated by "⊙" is perpendicular to the drawing plane and directed outward, and the current direction indicated by " " is perpendicular to the drawing plane and directed inward), it can be determined according to the left hand rule determining the direction applied to the energized conductor in the magnetic field that both of the forces applied to the first stator coil and the second stator coil have a leftward components F'. Since the stator coils are fixed, thus the force applied to the magnetic member has a rightward component F, based on the relationship between the acting force and the reacting force. Accordingly, the magnetic member which is subjected to a rightward pushing force will drives the weight block to perform a rightward translational movement together with the weight block, thereby squeezing the elastic support member at the right side of the weight block, meanwhile stretching the elastic support member at the left side of the weight block. Due to the presence of the first magnetic reinforcement member, the magnetic lines of force are increased in the first stator coil above the first magnetic reinforcement member, and meanwhile the magnetic lines of force are decreased in the second stator coil under the first magnetic reinforcement member. Similarly, due to the presence of the second magnetic reinforcement member, the magnetic lines of force are decreased in the first stator coil above the second magnetic reinforcement member, and meanwhile the magnetic lines of force are increased in the second stator coil under the second magnetic reinforcement member.

When the current directions in the first stator coil and the second stator coil change simultaneously, according to the left hand rule, both of the magnetic field forces applied to the first stator coil and the second stator coil have rightward components F'. However, since the stator coils are fixed, thus the force applied to the magnetic component has leftward a component F, and the magnetic member which is subjected to a leftward pushing force will drives the weight block and performs leftward translational movement together with the weight block, meanwhile the elastic support members at two ends of the weight block continue to be stretched/compressed after restored from squeezing/stretching state. The above movements are performed alternately, so that the vibrator formed by the vibration block and the weight block performs a reciprocate movement in a plane parallel to the plane of the stator coil, thereby realizing the vibration of the linear vibration motor.

Figure 4:
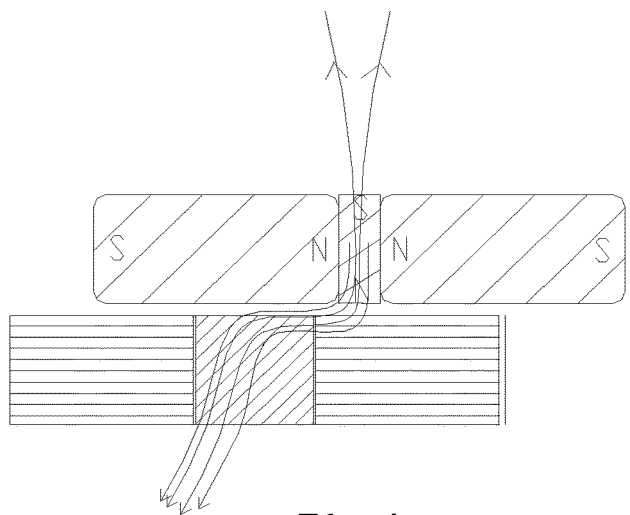
FIG. 4 is a schematic drawing of an assembled structure of a vibration block and a stator according to another embodiment of the present invention.

FIG. 4 shows an assembled structure of a vibration block and a stator according to another embodiment of the present invention.

As shown in FIG. 4, in this specific embodiment, the vibration block comprises two magnetic members arranged in a row (magnetization directions are S-N and N-S, respectively) and a magnetic reinforcement member arranged between the two magnetic members. The stator is disposed at one side of a vibrator (or vibration block) and comprises a stator coil and a magnetic conductive core arranged in the stator coil. One end of the magnetic reinforcement member close to the stator has the same magnetic polarity as adjacent ends of the two magnetic members, i.e., the magnetization direction of the magnetic reinforcement member is that the S pole is at the upper end thereof and the N pole is at the lower end thereof. The magnetic lines of force passing through the stator coils will increase due to the magnetic reinforcement member, therefore the vibration effect of the linear vibration motor will be intensified when the stator coils are energized.

Figures 1, 5:
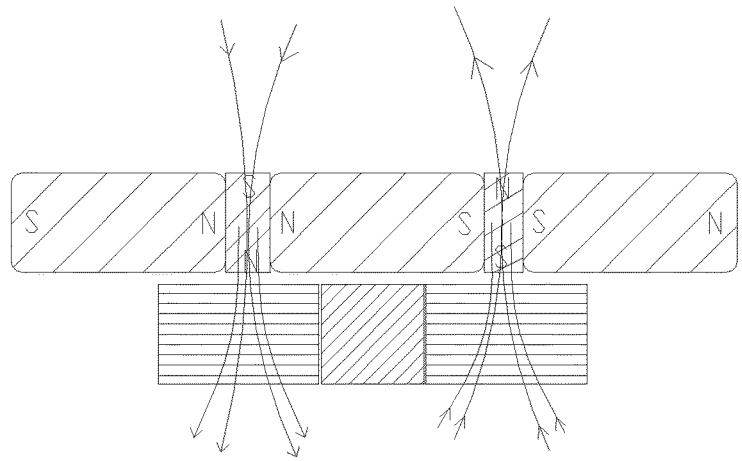
Figures 2, 5:
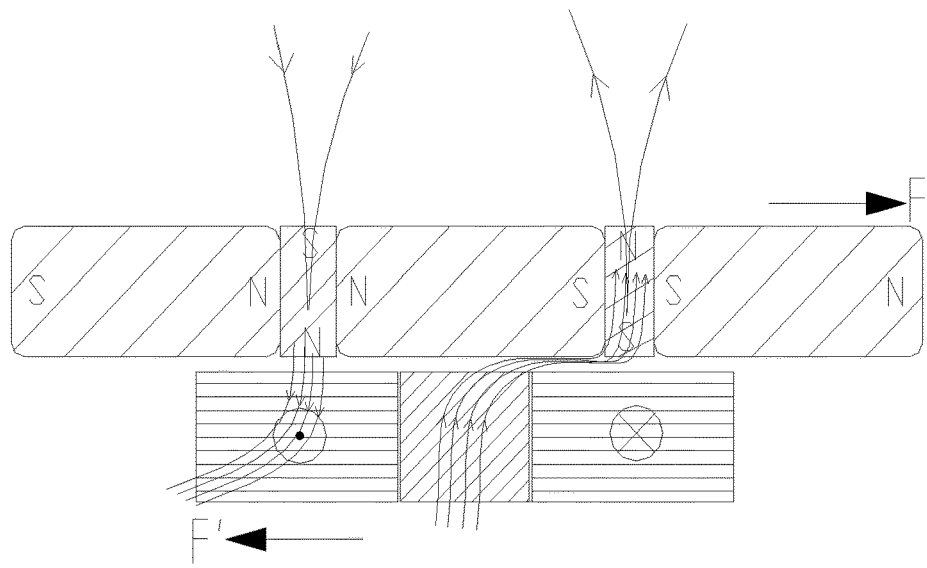

FIG. 5-1 shows an assembled structure of a vibration block and a stator according to still another embodiment of the present invention; and FIG. 5-2 shows the circumstance when the vibrator is subjected to a force in the state that the stator coil shown in FIG. 5-1 is energized.

As shown in FIG. 5-1 and FIG. 5-2, in this specific embodiment, the vibration block comprises a first magnetic member, a second magnetic member, a third magnetic member arranged in a row, a first magnetic reinforcement member arranged between the first magnetic member and the second magnetic member, and a second magnetic reinforcement member arranged between the second magnetic member and the third magnetic member. The stator is arranged on one side of the vibrator (or the vibration block) and comprises a stator coil and a magnetic conductive core arranged in the stator coil, wherein the magnetization directions of the first magnetic reinforcement member and the second magnetic reinforcement member are opposite. In this embodiment, the magnetic polarities of the ends of both of the first magnetic reinforcement member and the second magnetic reinforcement member close to the lower stator are the same as that of adjacent ends of the magnetic members at two sides thereof, i.e., the one end of the first magnetic reinforcement member close to the stator is the N pole, and the one end of the second magnetic reinforcement member close to the stator is the S pole.

The magnetic lines of force passing through the stator coils are increased due to the first magnetic reinforcement member and the second magnetic reinforcement member, therefore the vibration effect of the vibrator will be intensified when the stator coils are supplied with a current as shown in FIG. 5-2.

Figures 1, 6:
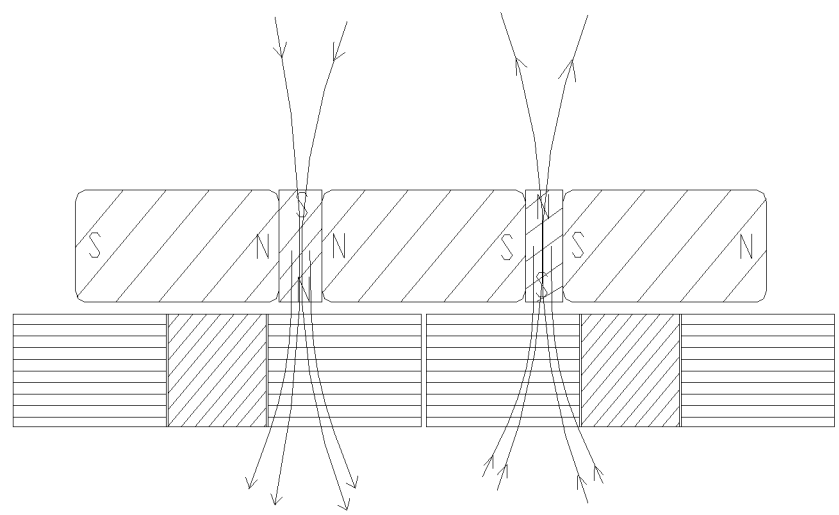
Figures 2, 6:
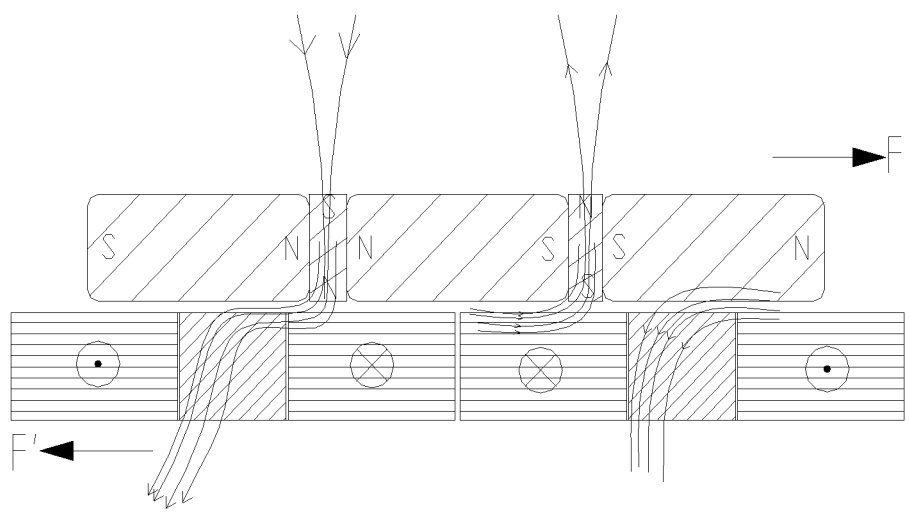

FIG. 6-1 shows an assembled structure of a vibration block and a stator according to still another embodiment of the present invention; and FIG. 6-2 shows the circumstance when the vibrator is subjected to a force in the state that the stator coil shown in FIG. 6-1 is energized.

As shown in FIGS. 6-1 and 6-2, in this specific embodiment, the vibration block comprises a first magnetic member, a second magnetic member, a third magnetic member arranged in a row, and a first magnetic reinforcement member arranged between the second magnetic force elements and the third magnetic force element, and a second magnetic reinforcement member arranged between the second magnetic member and the third magnetic member. The stator comprises a first stator and a second stator arranged on the same side of the vibrator (or the vibration block), and the first stator comprises a first stator coil and a first magnetic conductive core arranged in the first stator coil; the second stator comprises a second stator coil and a second magnetic conductive core arranged in the second stator coil, wherein one end of the first magnetic reinforcement member close to the first stator has the same magnetic polarity as the ends of the first magnetic member and the second magnetic member adjacent to the first magnetic reinforcement member, and similarly, one end of the second magnetic reinforcement member close to the second stator has the same magnetic polarity as the ends of the second magnetic member and the third magnetic member adjacent to the second magnetic reinforcement member. FIG. 6-1 schematically shows that the magnetization directions of the first magnetic reinforcement member and the second magnetic reinforcement member are opposite.

After the stator coils in the first stator and the second stator are supplied with currents with opposite direction, the circumstance that the vibrator is subjected to a force is similar to the circumstance analyzed in the above embodiment and will not be repeated herein.

As shown in FIGS. 1 and 2, in a specific embodiment of the present invention, a receiving groove may be symmetrically provided at two ends of the weight block 5, and a push-pull magnet 4 is disposed in the receiving grooves respectively. A push-pull coil 2 surrounding the push-pull magnet 4 is fixedly arranged on the housing (i.e., the upper cover 1 or the lower cover 11) at a position corresponding to the push-pull magnet 4. After energizing the push-pull coil 2, the push-pull coil 2 interacts with the push-pull magnet 4 therein so as to provide an additional driving force for the reciprocating motion of the vibrator in the horizontal direction.

In order to facilitate the winding and fixing of the push-pull coil 2, the linear vibration motor of the present invention may further comprise a push-pull coil bobbin 3. The push-pull coil 2 is wound on the push-pull coil bobbin 3. The push-pull coil 2 can be indirectly fixed to the housing by fixing the push-pull coil bobbin 3 to the housing of the linear vibration motor.

In addition, as described above, elastic support members 10 are further provided on both ends of the weight block 5, and one end of the elastic support member 10 is connected with the weight block, and the other end of the elastic support member 10 is fixed on the housing so that the vibrator is suspended in the space formed by the housing. The elastic support members 10 also provide an elastic restoring force for the vibration of the vibrator.

The linear vibration motor according to the present invention is described by way of example with reference to the accompanying drawings. However, those skilled in the art should understand that various modifications can be made to the linear vibration motor according to the above present invention without departing from the contents of the present invention. Therefore, the protection scope of the present invention should be determined by the contents of the appended claims.

What is claimed is:

1. A linear vibration motor comprising a vibrator and a stator disposed parallel to the vibrator, wherein the vibrator comprises a weight block and a vibration block embedded in the weight block, and the stator comprises a stator coil and a magnetic conductive core disposed inside the stator coil, wherein
the vibration block comprises at least two magnetic members arranged in a row and a magnetic reinforcement member disposed between adjacent magnetic members, and the magnetic members and the magnetic reinforcement member are permanent magnets; and
adjacent ends of each two adjacent magnetic members have the same polarity, and a magnetization direction of the magnetic reinforcement member is perpendicular to a magnetization direction of the magnetic members.

2. The linear vibration motor according to claim 1, wherein a magnetic pole direction of the magnetic reinforcement member is matched with a magnetization direction of the magnetic members at two sides of the magnetic reinforcement member, such that magnetic fields in the stator coil generated by the magnetic reinforcement member and the magnetic members are superposed so as to be increased.

3. The linear vibration motor according to claim 2, wherein
the vibration block comprises three magnetic members arranged in a row and two magnetic reinforcement members disposed between adjacent magnetic members, and the magnetic reinforcement members include a first magnetic reinforcement member and a second magnetic reinforcement member from left to right, respectively;
the stator comprises a first stator positioned at an upper side of the vibration block and a second stator positioned at a lower side of the vibration block; and
one end of the first magnetic reinforcement member close to the first stator has the same magnetic polarity as adjacent ends of the magnetic members at two sides of the first magnetic reinforcement member, and one end of the second magnetic reinforcement member close to the second stator has the same magnetic polarity as adjacent ends of the magnetic members at two sides of the second magnetic reinforcement member.

4. The linear vibration motor according to claim 2, wherein
the vibration block comprises three magnetic members arranged in a row and two magnetic reinforcement members disposed between adjacent magnetic members, and the magnetic reinforcement members include a first magnetic reinforcement member and a second magnetic reinforcement member from left to right, respectively;
the stator is disposed at one side of the vibration block; and
one end of the first magnetic reinforcement member close to the stator has the same magnetic polarity as adjacent ends of the magnetic members at two sides of the first magnetic reinforcement member, and one end of the second magnetic reinforcement member close to the stator has the same magnetic polarity as adjacent ends of the magnetic members at two sides of the second magnetic reinforcement member.

5. The linear vibration motor according to claim 2, wherein
the vibration block comprises two magnetic members arranged in a row and a magnetic reinforcement member disposed between the two magnetic members;
the stator is disposed at one side of the vibration block; and
one end of the magnetic reinforcement member close to the stator has the same magnetic polarity as adjacent ends of the two magnetic members.

6. The linear vibration motor according to claim 2, wherein
the vibration block comprises three magnetic members arranged in a row and two magnetic reinforcement members disposed between adjacent magnetic members, and the magnetic reinforcement members include a first magnetic reinforcement member and a second magnetic reinforcement member from left to right, respectively;
the stator comprises a first stator and a second stator disposed on a same side of the vibrator; and
one end of the first magnetic reinforcement member close to the first stator has the same magnetic polarity as adjacent ends of the magnetic members at two sides of the first magnetic reinforcement member, and one end of the second magnetic reinforcement member close to the second stator has the same magnetic polarity as adjacent ends of the magnetic members at two sides of the second magnetic reinforcement member.

7. The linear vibration motor according to claim 1, wherein an axis direction of the stator coil is perpendicular to a magnetization direction of the magnetic members of the vibration block, and the magnetic reinforcement member and the magnetic conductive core are arranged in a misaligned manner.

8. The linear vibration motor according to claim 3, wherein a misaligned distance between the magnetic reinforcement member and the magnetic conductive core in a horizontal direction is in the range of 0.1 mm to 0.3 mm.

9. The linear vibration motor according to claim 3, wherein
the first stator comprises a first stator coil and a first magnetic conductive core disposed inside the first stator coil, and the second stator comprises a second stator coil and a second magnetic conductive core disposed inside the second stator coil; and
axes of the first stator coil and the second stator coil are disposed parallel to each other, and current directions in the first stator coil and the second stator coil are opposite.

10. The linear vibration motor according to claim 1, further comprising:
a housing;
push-pull magnets symmetrically provided at two ends of the vibrator; and
push-pull coils surrounding the push-pull magnets and fixedly arranged on the housing at positions corresponding to the push-pull magnets,
wherein the push-pull magnets are received in receiving grooves provided in the weight block.

11. The linear vibration motor according to claim 10, further comprises push-pull coil bobbins, and the push-pull coils are wound on the push-pull coil bobbins.

* * * * *